US011748326B2

(12) United States Patent
Hisano (10) Patent No.: US 11,748,326 B2
(45) Date of Patent: Sep. 5, 2023

(54) DATA FLOW CONTROL DEVICE AND DATA FLOW CONTROL METHOD

(71) Applicant: OMRON Corporation, Kyoto (JP)

(72) Inventor: Atsushi Hisano, Kyoto (JP)

(73) Assignee: Omron Corporation, Kyoto (JP)

( * ) Notice: Subject to any disclaimer, the term of this patent is extended or adjusted under 35 U.S.C. 154(b) by 1649 days.

(21) Appl. No.: 15/576,470

(22) PCT Filed: Jun. 28, 2016

(86) PCT No.: PCT/JP2016/069174
§ 371 (c)(1),
(2) Date: Nov. 22, 2017

(87) PCT Pub. No.: WO2017/002820
PCT Pub. Date: Jan. 5, 2017

(65) Prior Publication Data
US 2018/0157692 A1    Jun. 7, 2018

(30) Foreign Application Priority Data

Jun. 30, 2015 (JP) .................................. 2015-131161

(51) Int. Cl.
 *G06F 16/22* (2019.01)
 *G06F 16/28* (2019.01)
 (Continued)

(52) U.S. Cl.
CPC .......... *G06F 16/2272* (2019.01); *G06F 13/00* (2013.01); *G06F 16/288* (2019.01);
(Continued)

(58) Field of Classification Search
CPC ............... G06F 16/2272; G06F 16/288; G06F 16/9024; G06F 13/00; G06F 17/18;
(Continued)

(56) References Cited

U.S. PATENT DOCUMENTS 8,614,633 B1 * 12/2013 Lear ..................... G08B 29/188
                                                 340/984
9,053,430 B2 *  6/2015 Kannan .................. G06N 3/049
(Continued)

FOREIGN PATENT DOCUMENTS

CA      2861215 A1 *  3/2014  ........... G08G 1/0112
CN    103688473 A  *  3/2014  ......... G06F 9/45533
(Continued)

OTHER PUBLICATIONS

Extended European Search Report in counterpart European Application No. 16817928.1 dated Feb. 20, 2019 (10 pages).
(Continued)

*Primary Examiner* — Shean Tokuta
(74) *Attorney, Agent, or Firm* — Osha Bergman Watanabe & Burton LLP (57) ABSTRACT

A dataflow control apparatus has a causal network storage unit that stores a causal network representing a causal relationship between a plurality of indices that include at least a plurality of device indices which are respectively data obtained in a plurality of devices and an objective index which is an index that an application controls or predicts, a device index selection unit that selects, based on the causal network, at least one device index having a causal relationship with the objective index of the application, from among the plurality of device indices, in a case where a data request is received from the application, and a dataflow control unit that controls the dataflow, such that data obtained in the device corresponding to the selected device index is provided to the application.

10 Claims, 10 Drawing Sheets

(51) Int. Cl.

| | | |
|---|---|---|
| G06F 16/901 | (2019.01) | |
| H04M 11/00 | (2006.01) | |
| G06F 13/00 | (2006.01) | |
| H04W 4/38 | (2018.01) | |
| G06F 17/18 | (2006.01) | |
| H04W 4/70 | (2018.01) | |
| H04L 67/1097 | (2022.01) | |

(52) U.S. Cl.
CPC .......... *G06F 16/9024* (2019.01); *G06F 17/18* (2013.01); *H04L 67/1097* (2013.01); *H04M 11/00* (2013.01); *H04W 4/38* (2018.02); *H04W 4/70* (2018.02)

(58) Field of Classification Search
CPC ...... H04W 4/38; H04W 4/70; H04L 67/1097; H04M 11/00

See application file for complete search history.

(56) References Cited

U.S. PATENT DOCUMENTS

| | | | |
|---|---|---|---|
| 9,319,856 B1* | 4/2016 | Riggs | H04N 21/64753 |
| 2007/0118496 A1* | 5/2007 | Bornhoevd | H04L 67/63 |
| | | | 340/426.2 |
| 2008/0164997 A1 | 7/2008 | Aritsuka et al. | |
| 2013/0073576 A1* | 3/2013 | Lillethun | H04W 4/38 |
| | | | 707/E17.014 |
| 2013/0163410 A1* | 6/2013 | Sen | H04W 84/20 |
| | | | 370/255 |
| 2014/0258474 A1 | 9/2014 | Kim | |
| 2018/0157692 A1* | 6/2018 | Hisano | H04W 4/70 |
| 2018/0224831 A1* | 8/2018 | Liu | G05B 23/0232 |
| 2021/0083945 A1* | 3/2021 | Bitterfeld | G06F 16/355 |

FOREIGN PATENT DOCUMENTS

| | | | | |
|---|---|---|---|---|
| CN | 107431844 A * | 12/2017 | ........... | H04L 67/141 |
| CN | 114503507 A * | 5/2022 | ........... | G06F 21/602 |
| EP | 1850277 A1 * | 10/2007 | ........... | G06N 3/126 |
| EP | 1862957 A1 * | 12/2007 | ........... | G06Q 10/00 |
| EP | 1863316 A2 * | 12/2007 | ........... | G06F 8/60 |
| EP | 3318976 A1 * | 5/2018 | ........... | G06F 13/00 |
| EP | 3370201 A1 * | 9/2018 | ........ | G06F 17/30569 |
| JP | 2000-331284 A | 11/2000 | | |
| JP | 2007-300571 A | 11/2007 | | |
| JP | 2010287011 A * | 12/2010 | ........ | G05B 23/0254 |
| JP | 2012023747 A * | 2/2012 | ........... | H04L 41/50 |
| JP | 5445722 B1 * | 3/2014 | ........... | G08G 1/0112 |
| JP | 2017102793 A * | 6/2017 | ........... | G06F 13/00 |
| JP | 2017111501 A * | 6/2017 | ........... | G06F 13/00 |
| JP | 2018096864 A * | 6/2018 | | |
| JP | 2018107684 A * | 7/2018 | ........ | H04L 12/2807 |
| JP | 2018124935 A * | 8/2018 | | |
| JP | 6424993 B1 * | 11/2018 | ........... | G06Q 50/10 |
| JP | 6432719 B1 * | 12/2018 | ........... | G06Q 30/06 |
| KR | 20060083543 A * | 7/2006 | | |
| KR | 100683848 B1 * | 2/2007 | | |
| WO | 2014/030510 A1 | 2/2014 | | |
| WO | 2014/041826 A1 | 3/2014 | | |
| WO | WO-2014041826 A1 * | 3/2014 | ........... | G08G 1/0112 |
| WO | 2014/153890 A1 | 10/2014 | | |
| WO | WO-2017002820 A1 * | 1/2017 | ........... | G06F 13/00 |
| WO | WO-2017094442 A1 * | 6/2017 | ........... | G06F 13/00 |
| WO | WO-2017104287 A1 * | 6/2017 | ........... | G06F 13/00 |
| WO | WO-2017159005 A1 * | 9/2017 | ........... | G06F 16/00 |
| WO | WO-2017159006 A1 * | 9/2017 | ........... | G06F 16/907 |
| WO | WO-2018088039 A1 * | 5/2018 | ........... | G06F 11/22 |
| WO | WO-2018088040 A1 * | 5/2018 | ........ | G06F 16/2379 |
| WO | WO-2018110095 A1 * | 6/2018 | ........... | G06F 9/542 |
| WO | WO-2018110099 A1 * | 6/2018 | ........... | G06F 13/00 |
| WO | WO-2018142598 A1 * | 8/2018 | ........... | G06Q 10/00 |
| WO | WO-2018142764 A1 * | 8/2018 | ........... | G06F 16/583 |
| WO | WO-2018142765 A1 * | 8/2018 | ........... | G06K 9/6262 |
| WO | WO-2018142766 A1 * | 8/2018 | ........... | G06F 16/00 |
| WO | WO-2018163520 A1 * | 9/2018 | ........... | G06F 11/302 |
| WO | WO-2018225576 A1 * | 12/2018 | ........... | G06F 16/215 |
| WO | WO-2019026602 A1 * | 2/2019 | ........... | A61B 5/00 |
| WO | WO-2019026635 A1 * | 2/2019 | ........... | G06F 16/00 |
| WO | WO-2019026708 A1 * | 2/2019 | ........... | G06Q 10/06 |
| WO | WO-2019026710 A1 * | 2/2019 | ........... | G06Q 50/10 |
| WO | WO-2019026711 A * | 2/2019 | ........... | G10L 19/012 |
| WO | WO-2019031283 A1 * | 2/2019 | ........... | H04M 11/00 |
| WO | WO-2019058725 A1 * | 3/2019 | ........... | G06Q 30/06 |
| WO | WO-2019058726 A1 * | 3/2019 | ........... | G06Q 50/10 |

OTHER PUBLICATIONS

Cédric Eichler et al.; "Graph-based formalism for Machine-to-Machine self-managed communications"; 10.1109/WETICE. 2013. 45; XP055553714; pp. 74-79; Aug. 12, 2013; Retrieved from the Internet: URL: https://hal.archives-ouvertes.fr/file/index/docid/789347/filename/Paper.pdf (8 pages).

Anand Paul; "Graph based M2M optimization in an IoT environment"; Proceedings of the 2013 Research in Adaptive and Convergent Systems On, RACS '13; XP055554358; pp. 45-46; New York, New York; Oct. 1, 2013 (2 pages).

Juhani Latvakoski et al.; "A Survey on M2M Service Networks"; Computers; vol. 3; No. 4; XP055554359; pp. 130-173; Nov. 20, 2014 (44 pages).

Dominik Janzing et al; "Quantifying casual influences"; Annals of Statistics; vol. 41; No. 5; XP055552127; pp. 2324-2358; Oct. 1, 2013 (36 pages).

Office Action issued in the counterpart European Patent Application No. 16817928.1, dated Sep. 15, 2021 (8 pages).

Notification of Reasons for Refusal issued in Japanese Application No. 2015-131161, dated Jul. 17, 2018 (6 pages).

Tetsuya Nakamura et al., "Context handling architecture for adaptive networking services"; IPSJ SIG Notes, vol. 2000, No. 14, pp. 83-90; Feb. 4, 2000 (10 pages).

Kazuki Komura et al., "Analysis of the investment indexes constructed from influence networks among stocks by using Transfer Entropy"; Special Interest Group on Financial Infomatics; pp. 1-6; Oct. 11, 2014 (6 pages).

International Search Report issued in corresponding application No. PCT/JP2016/069174 dated Sep. 20, 2016 (2 pages).

Written Opinion of the International Searching Authority issued in corresponding application No. PCT/JP2016/069174 dated Sep. 20, 2016 (8 pages).

* cited by examiner

Office Productivity

| Date-Time | Value (a.u.) |
|---|---|
| 2014/8/1 12:00:00 | 70.2 |
| 2014/8/1 13:00:00 | 73.8 |
| 2014/8/1 14:00:00 | 68.0 |
| ⋮ | ⋮ |
| ⋮ | ⋮ |

FIG. 6(A) Room temperature sensor

| Date-Time | Temp. (°C) |
|---|---|
| 2014/8/1 12:00:00 | 27.2 |
| 2014/8/1 13:00:00 | 26.8 |
| 2014/8/1 14:00:00 | 27.4 |
| ... | ... |

FIG. 6(B) Ambient Temperature Sensor

| Date-Time | Temp. (°C) |
|---|---|
| 2014/8/1 12:00:00 | 36.5 |
| 2014/8/1 13:00:00 | 39.0 |
| 2014/8/1 14:00:00 | 37.2 |
| ... | ... |

FIG. 6(C) Power Consumption Amount of Air-conditioner

| Date-Time | Power consumption (kW) |
|---|---|
| 2014/8/1 12:00:00 | 2.3 |
| 2014/8/1 13:00:00 | 2.9 |
| 2014/8/1 14:00:00 | 2.6 |
| ... | ... |

FIG. 6(D) Noise Sensor in Office

| Date-Time | Level (dB) |
|---|---|
| 2014/8/1 12:00:00 | 55 |
| 2014/8/1 13:00:00 | 53 |
| 2014/8/1 14:00:00 | 62 |
| ... | ... |

DATA FLOW CONTROL DEVICE AND DATA FLOW CONTROL METHOD

BACKGROUND

Technical Field

The present invention relates to a technology for controlling a dataflow and that provides data obtained in a device such as a sensor to an application that utilizes the data.

Related Art

Currently, an IT environment called M2M Cloud is garnering attention. M2M (Machine to Machine) refers to a system in which machines of various application, size and performance exchanges information over a network. By utilizing this information, appropriate control of the respective machines and situation analysis of everyday society becomes possible. As a result of improvements in wireless communication technology, miniaturization of machines, cost reductions and the like that support M2M, expectations for implementation are building.

The platform obtained by realizing such M2M technology in a cloud computing environment is called an M2M Cloud. This provides basic functions required for M2M and services ranging, for example, from data collection and storage to processing and analysis as applications on a cloud, enabling utilization from anywhere. Collective management of data can enhance reliability and completeness. Also, for users, there is the merit of being able to utilize as much collected data and as many computer resources as needed. Thus, it is possible to analyze big data and obtain added value without building a system individually, and application in a wide range of fields is expected.

Also, as shown in Patent Document 1, a technology called a sensor network is being investigated. This technology enables collection, management and seamless utilization of sensing data, by installing sensor devices (hereinafter, also referred to simply as "sensors") having a sensing function and a communication function at various locations or industrial facilities, and networking these sensors.

Usually, sensors are installed in order to collect data that is required by the entity to which the sensors belong. Thus, it is often the case that the sensing data is not utilized (the sensors themselves are not operating or the sensing data is not utilized even when the sensors are operating) except when data is collected by the entity to which the sensors belong. Thus, the distributability of the sensing data is low, and no matter how significant the data is to a third party, analysis and utilization is limited to the entity to which the sensors belong. As a result, this causes overlapping investment of facilities and network congestion due to communication with individually installed sensors.

Also, a technology called IoT (Internet of Things) is being investigated. Because this technology produces new values by combining information relating to many things that exist in the world over a network, seamless deployment of various services including social infrastructure is expected. In order to produce values from IoT, the state of the thing that is connected to the network needs to be known, and sensing and communication become important element technologies.

In view of this, the applicant of the present invention, in order to realize a mechanism for appropriately distributing resources such as sensing data in IoT, investigated a system that specifies sensors capable of acquiring sensing data that satisfies a request from an application, and controls the dataflow from the sensors to the application, by performing matching of "sensor-side metadata" in which information relating to the sensors is described with "app-side metadata" in which information relating to the application that utilizes the sensing data is described (see Patent Document 3).

Patent Document 1: JP 2007-300571A
Patent Document 2: JP 2000-331284A
Patent Document 3: WO 2014/041826

SUMMARY OF THE INVENTION

With the system of Patent Document 3, the type and specification of sensing data that is required by an application must be defined in the app-side metadata.

However, it is not easy for a developer or a designer of an application to appropriately design what kind of sensing data to collect from what kind of device to be useful in control of the application, in order to attain the objective of the application. One of the reasons is that with IoT all of the sensors are connected to a network, and huge amounts of various types of sensing data are available. Also, a second reason is that since various events and elements are intricately related in the real world, it is extremely difficult to appropriately model that and ascertain sensing data (cause) having a strong causal relationship with the objective (effect) of the application.

Also, even if the type and specification of required sensing data could be defined beforehand, the network configuration (i.e., available sensors and acquirable data) could possibly be ever-changing due to stoppage, malfunction, movement and the like of sensors, and situations in which sensing data is not obtained as defined can also arise. In order to enhance the robustness of the system, a flexible mechanism that is able to provide the most appropriate sensors and sensing data from among the available sensors and acquirable data is desirable.

Note that while description has been given above taking a sensor network as an example, exactly the same issues can also arise in the case of a network of actuators (controllers). "Sensor" and "actuators (controllers)", despite differing in that one "detects (acquires) a state" whereas the other "changes a state", are similar in the fact that they both perform an action of some sort on a target region having a predetermined range. In the case of an actuator network, control data that is supplied to actuators is distributed, instead of the sensing data that is obtained from sensors. Hereinafter, the term "device" will be used as a concept that encompasses "sensors" and "actuators". Also, the term "device network" will be used as a concept that encompasses "sensor networks" and "actuator networks". It is also possible for both actuators and sensors to be connected in a device network.

One or more embodiments of the present invention provides a technology for further facilitating utilization of data in a device network.

According to one or more embodiments of the present invention, a dataflow control apparatus controls a dataflow and provides data obtained in at least one device among a plurality of devices to an application that utilizes the data, the apparatus including a causal network storage unit that stores a causal network representing a causal relationship between a plurality of indices that include at least a plurality of device indices which are respectively data obtained in the plurality of devices and an objective index which is an index that the application controls or predicts, a device index selection unit that selects, based on the causal network, at least one device index having a causal relationship with the objective index of the application, from among the plurality of device indices, in a case where a data request is received from the application, and a dataflow control unit that controls the dataflow, such that data obtained in the device corresponding to the selected device index is provided to the application.

Accordingly, when the objective of the application (index that the application controls or predicts) is supplied, data that has a causal relationship with the objective is automatically provided to the application from a corresponding device. Accordingly, design and development of applications become possible, even without knowing what kind of devices exist in the device network, what kind of data can be acquired, or what kind of data to refer to in order to perform the control or prediction serving as the objective. Therefore, compared with former technologies, design and development of applications utilizing data in the device network is facilitated, and utilization and distribution of data in the device network are promoted.

According to one or more embodiments of the present invention, the causal relationship includes information on a causal strength between two indices and information on a delay time taken for an influence of one of the two indices to propagate to the other index. Accordingly, a causal relationship that takes into consideration the time delay (propagation delay) from one index (cause index) to the other index (effect index) can be evaluated.

According to one or more embodiments of the present invention, the causal relationship is defined using transfer entropy. Accordingly, the causal relationship associated with the time delay (propagation delay) and the causal strength of that relationship can be appropriately derived by using transfer entropy.

According to one or more embodiments of the present invention, the device index selection unit preferentially selects, in the causal network, the device index whose distance to the objective index is closest, preferentially selects the device index whose causal strength is strongest in a case where distances are the same, and preferentially selects the device index whose delay time is shortest in a case where distances and causal strengths are the same. Accordingly, the device index having the strongest relationship with the objective index can be selected. Using a device index selected in this way enables the value of the objective index to be inferred with high validity.

According to one or more embodiments of the present invention, the device index selection unit checks whether the devices are active or inactive, and excludes the device indices corresponding to inactive devices from selection. Accordingly, devices that are in an inactive state (state where data cannot be acquired) due to a cause of some sort, such as malfunction, stoppage, movement or the like, are excluded from selection, for example. Accordingly, an appropriate device (device capable of acquiring data having a causal relationship with the objective index of the application) can be automatically selected, from among the devices that are currently active, and the robustness of the system can be enhanced.

According to one or more embodiments of the present invention, a dataflow control method controls a dataflow and provides data obtained in at least one device among of a plurality of devices to an application that utilizes the data, the method including a step of selecting, based on a causal network representing a causal relationship between a plurality of indices that include at least a plurality of device indices which are respectively data obtained in the plurality of devices and an objective index which is an index that the application controls or predicts, at least one device index having a causal relationship with the objective index of the application, from among the plurality of device indices, in a case where a data request is received from the application, and a step of controlling the dataflow, such that data obtained in the device corresponding to the selected device index is provided to the application.

Accordingly, when the objective of the application (index that the application controls or predicts) is supplied, data having a causal relationship with the objective is automatically provided to the application from a corresponding device. Accordingly, design and development of applications become possible, even without knowing what kind of devices exist in the device network, what kind of data can be acquired, or what kind of data to refer to in order to perform the control or prediction serving as the objective. Therefore, compared with former technologies, design and development of applications utilizing data in the device network is facilitated, and utilization and distribution of data in the device network are promoted.

According to one or more embodiments of the present invention, a program causes a computer to execute one or more of the steps of the dataflow control method set forth in the present application.

According to one or more embodiments of the present invention, when the objective of the application (index that the application controls or predicts) is supplied, data having a causal relationship with the objective is automatically provided to the application from a corresponding device. Accordingly, design and development of applications become possible, even without knowing what kind of devices exist in the device network, what kind of data can be acquired, or what kind of data to refer to in order to perform the control or prediction serving as the objective. Therefore, compared with former technologies, design and development of applications utilizing data in the device network is facilitated, and utilization and distribution of data in the device network are promoted.

According to one or more embodiments of the present invention, a control command data stream is readable by an information processing apparatus for managing sensors that output sensing data, the data stream including information specifying an application that utilizes the sensing data, information specifying a sensor selected to output sensing data having a causal relationship with an objective index which is an index that the application controls or predicts, and information on the causal relationship between the sensing data obtained by the selected sensor and the objective index. Accordingly, a dataflow in which sensing data having a causal relationship with the objective of the application (index that the application controls or predicts) is provided to the application from a corresponding sensor can be realized.

According to one or more embodiments of the present invention, the causal relationship information includes information on a causal strength between the sensing data and the objective index and information on a delay time taken for an influence of the sensing data to propagate to the objective index. Accordingly, dataflow control that takes into consideration the time delay (propagation delay) from the sensing data (cause index) to the objective index (effect index) can be realized.

Note that one or more embodiments of the present invention can be regarded as a dataflow control apparatus having at least part of the above configurations or functions. One or more embodiments of the present invention can also be regarded as a device network system, a sensor network system or an actuator network system having a dataflow control apparatus. One or more embodiments of the present invention can also be regarded as a dataflow control method including at least part of the above processing, or a program for causing a computer to execute this method, or a computer-readable recording medium on which such a program is recorded in a non-transitory manner. One or more embodiments of the present invention can also be regarded as a control command data stream for controlling the above dataflow. One or more embodiments of the present invention can be constituted by combining the above configurations and various processing as long as technical inconsistencies do not occur.

According to one or more embodiments of the present invention, utilization of the data in a device network can be facilitated.

DETAILED DESCRIPTION

System Configuration

Figure 1:
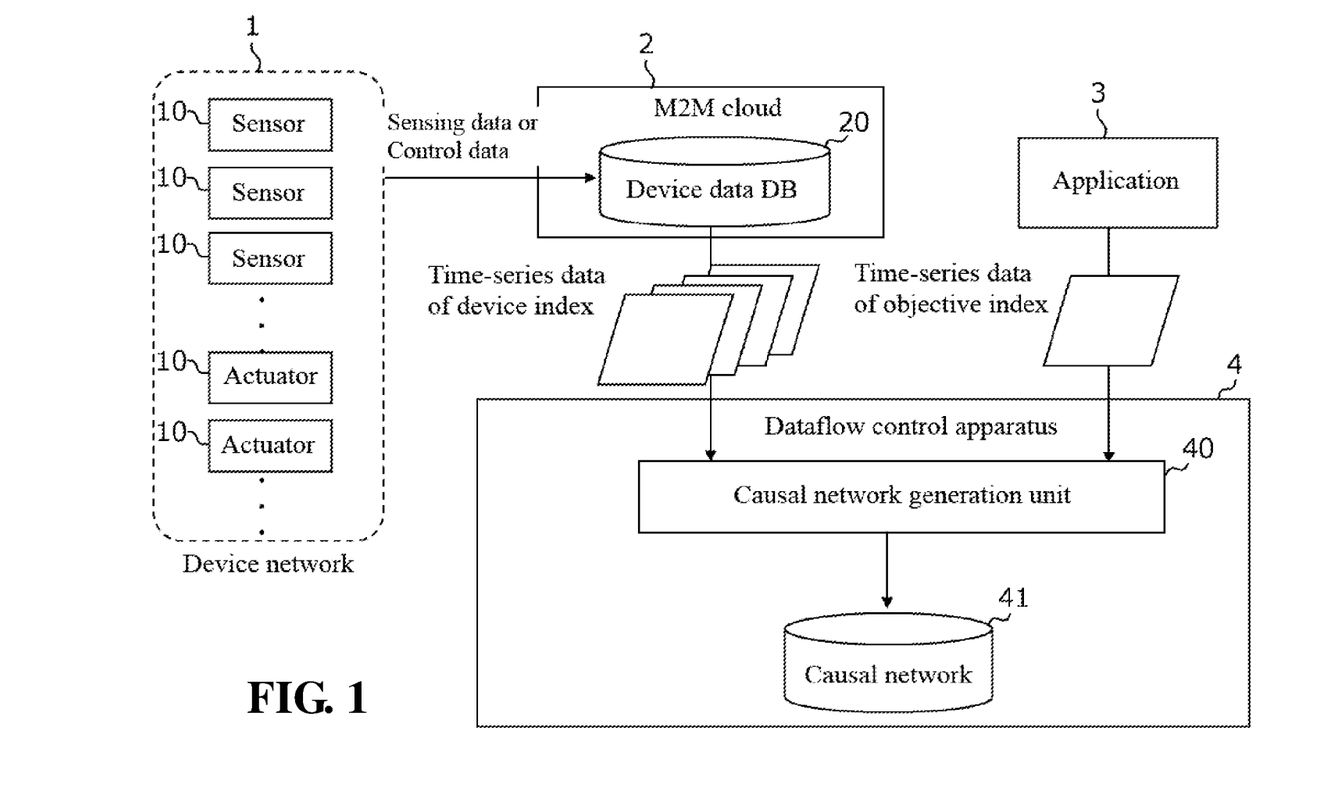
FIG. 1 is a block diagram showing functions related to generation of a causal network of a device network system.
Figure 2:
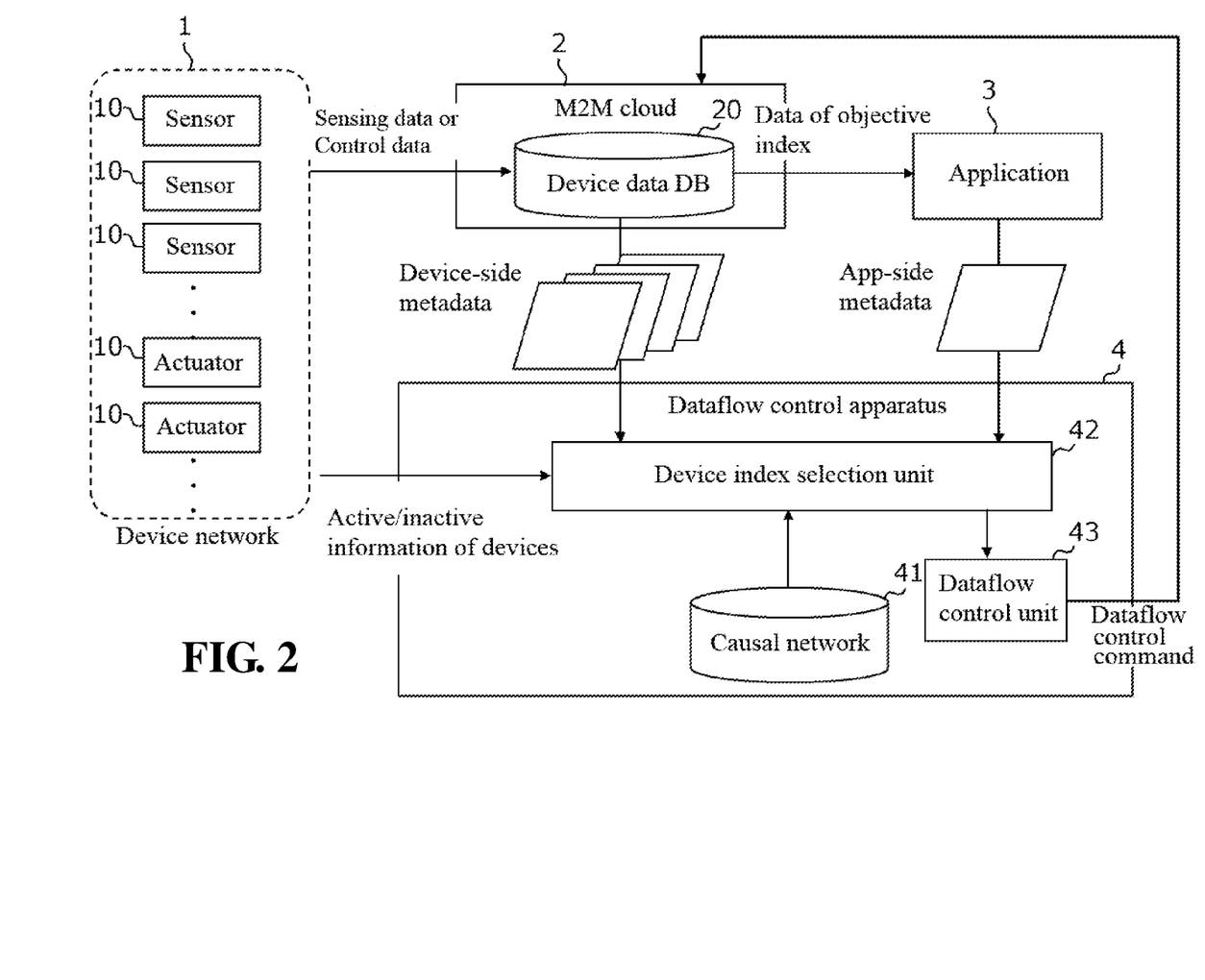
FIG. 2 is a block diagram showing functions related to a dataflow control of the device network system.

An exemplary configuration of a device network system according to one or more embodiments of the present invention will be described, with reference to FIGS. 1 and 2. FIG. 1 is a block diagram showing functions related to generation of a causal network of the device network system, and FIG. 2 is a block diagram showing functions related to dataflow control of the device network system.

The device network system is a mechanism capable of providing data that is acquired in a large number of devices online and in real time to an application that utilizes the data. The device network system is mainly constituted by a device network 1, an M2M cloud server 2, an application 3, a dataflow control apparatus 4, and the like.

Device Network

The device network 1 is a network that is constituted by a large number of devices 10. The devices 10 can be suitably designed in terms of number, type, installation position, network configuration, communication method and the like, and are not particularly limited in these respects. Each of the devices 10 is able to communicate with the M2M cloud server 2, the application 3 and the dataflow control apparatus 4 via a wide area network such as the Internet, for example.

The devices 10 are each a device that acts on a target region that is designated in space or space-time, and can be broadly divided into "sensors" and "actuators". Here, "space" is a region that is defined in two dimensions (x, y) or three dimensions (x, y, z), and "space-time" is a region in which the dimension of "time(t)" is added to "space", or in other words, a region that is defined in three dimensions (x, y; t) or four dimensions (x, y, z; t). Note that, in this specification, the word "sensor" is used to mean a device that detects (acquires) the state of the target region, and the word "actuator" is used to mean a device that changes the state of the target region. Sensors include image sensors (cameras), temperature sensors, humidity sensors, illumination sensors, force sensors, sound sensors, RFID sensors, infrared sensors, attitude sensors, rainfall sensors, radiation sensors and gas sensors, for example, and any type of sensor can be utilized in the system of one or more embodiments of the present invention. Also, actuators include various devices such as motors, solenoids, controllers, robots, lighting, speakers, displays, digital signage and air-conditioning, for example, and any type of actuator can be utilized in the system of one or more embodiments of the present invention. There are also devices provided with both sensors (image sensor, etc.) and actuators (display, speaker, etc.), such as mobile phones, smartphones and slate terminals (tablet PCs). Note that it is possible for various types of devices to exist together in the device network 1.

M2M Cloud Server

The M2M cloud server 2 is a server system that manages information relating the devices 10 constituting the device network 1, data acquired by the devices 10 and the like, and that provides data acquired by the devices 10 to a user (application 3) via a wide area network.

The M2M cloud server 2 has a device data DB 20 which is a database for managing the devices 10. In the device data DB 20 is registered, as information relating to the devices, attribute information of the devices (type of device, position and posture of device, entity to which device belongs, device ID, network address, operation history, etc.), attribute information (positional range, temporal range, etc.) of the target region (region in which sensing is performed, region in which actuator acts), attribute information (type, physical attribute, object ID, etc.) of the object (object of sensing, object on which actuator acts), attribute information of operations (controllable items, sampling specifications of sensing, quantization specifications, etc.), and attributes of data (administrator of data or entity to which data belongs, utilization range (e.g., limited to academic utilization, prohibition of commercial utilization, etc.), access authority zone, type of data, accuracy, system of units, reliability, utilizable range, price of utilization, data ID, etc.), for example. Also, in the device data DB 20 is stored, as data acquired by the devices, sensing data (sensor measurement value) in the case of a sensor and control data (actuator control values) in the case of an actuator. It is favorable for not only the latest sensing data and control data but also for time-series data for a predetermined period to be stored.

Application

The application 3 is an apparatus or a software module that utilizes data obtained from the device network 1. As the application 3, an application that controls a control target on the basis of the data obtained from the device network 1, an application that predicts an unknown or a future state on the basis of the data obtained from the device network 1 or the like is envisaged. For example, any application is applicable, such as an application that improves office productivity, an application that suppresses or predicts energy consumption in a factory, or an application that performs traffic jam prediction.

Dataflow Control Apparatus

The dataflow control apparatus 4 has a function of matching conditions between the devices and the application, and controlling the dataflow such that data required by the application to attain the intended objective (control or prediction) is provided from an appropriate device.

With a conventional system (see Patent Document 3), a mechanism was adopted in which app-side metadata that defines the specification of data required by the application is issued and a search is performed for a device that satisfies the required specification. However, in the case of such a mechanism, the developer or designer of an application not only has to know what kind of devices exist in the device network 1 and what kind of data can be acquired, but also has to know what kind of data to refer to in order to perform the control or prediction serving as the objective and so forth, requiring advanced development skills. Also, there are many cases where it not obvious what kind of data to refer to in order to perform the control or prediction serving as the objective, such as with the aforementioned application that aims to "improve office productivity". Also, even if a problem appears easy at first, various events in the real world can also have an effect.

In view of this, in the system of one or more embodiments of the present invention, the dataflow control apparatus 4 implements (1) a function (see FIG. 1) of generating a causal network representing a causal relationship between a plurality of indices that include at least data (called a "device index") that is obtained in each of the devices 10 and an index (called an "objective index") that the application 3 controls or predicts, and (2) a function (see FIG. 2) of selecting a device index having a causal relationship with the objective index, using this causal network, and controlling the dataflow such that the data of the selected device index is provided to the application 3. Here, "an index that the application controls" refers to an index representing the state of the control target that the application controls or the like, and is, for example, an index that can be observed by measuring the state or output of the control target using a sensor or the like. For example, as an index directly or indirectly representing productivity in the case of an application that improves office productivity, the number of transactions per unit time, sales or the like can be used as the objective index. Also, "an index that the application predicts" refers to an index that the application predicts or infers through calculation. For example, in the case of an application that performs traffic jam prediction, the time expected to travel the road, the length of the traffic jam and the like can be used as the objective index. A detailed description thereof will be given.

The M2M cloud server 2, an apparatus that executes the application 3 and the dataflow control apparatus 4 can all be constituted by a general-purpose computer that has a CPU (central processing unit), a memory, an auxiliary storage device, a communication IF, an input device, a display device, and the like. Functions and processing which will be discussed later are realized by the CPU loading and executing programs stored in the auxiliary storage device. The computer may be a personal computer, a smartphone, a portable information terminal or the like, or may be a server computer. Also, the processing may be performed, not by one computer, but through distributed processing by a plurality of computers.

Generation of Causal Network

Figure 3:
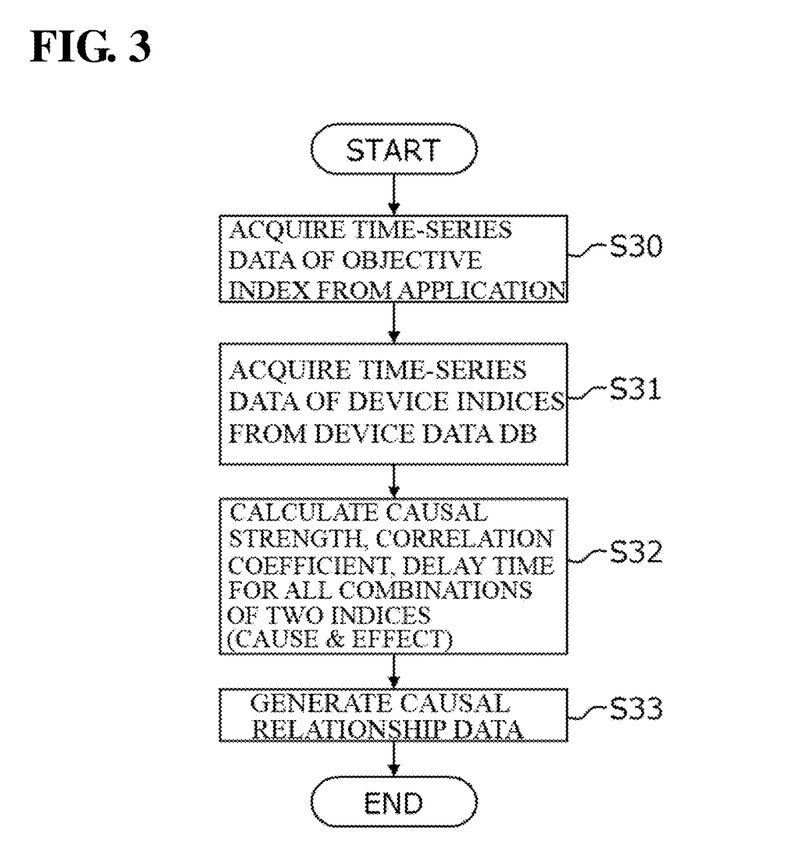
FIG. 3 is a flowchart of generation processing of the causal network.
Figure 4:
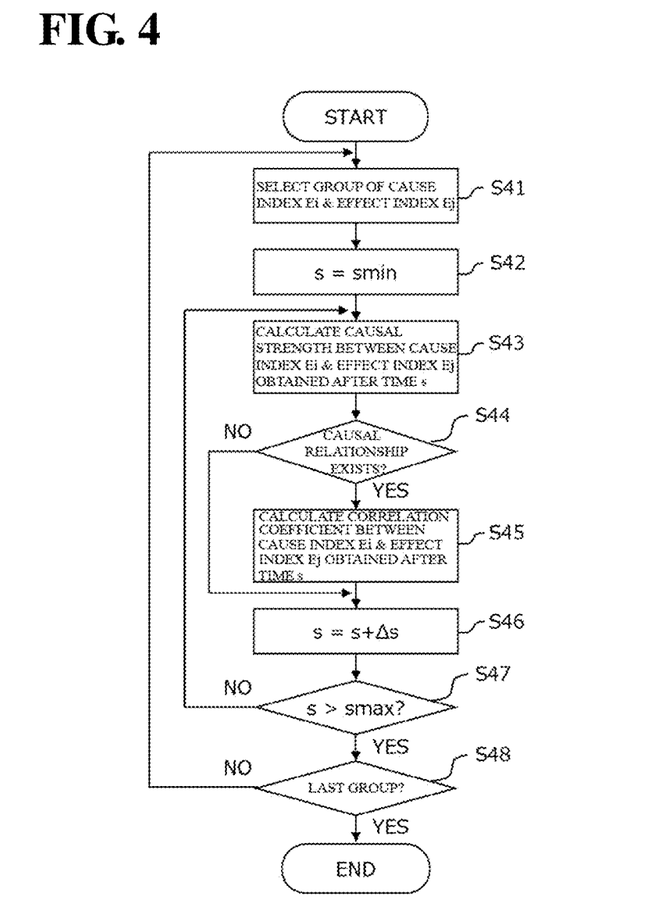
FIG. 4 is a flowchart of generation processing of the causal network.
Figure 5:
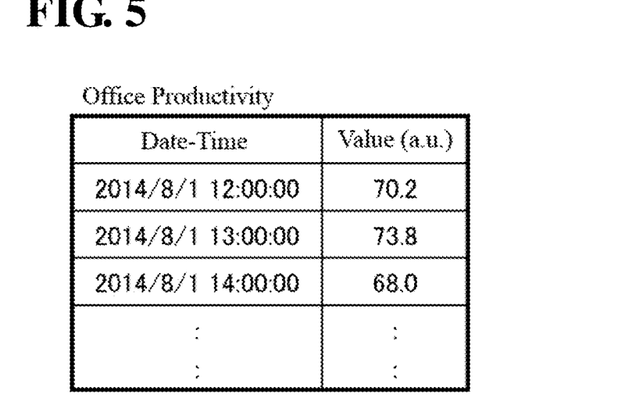
FIG. 5 shows an example of time-series data of an objective index.
Figure 6A:
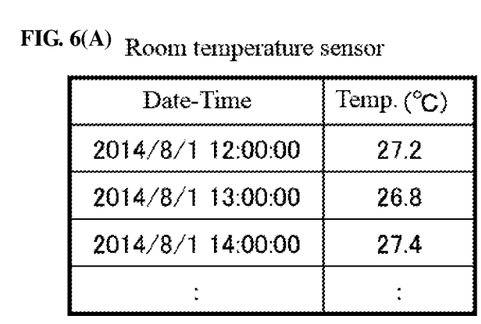
FIGS. 6A to 6D show examples of time-series data of a device index.
Figure 6B:
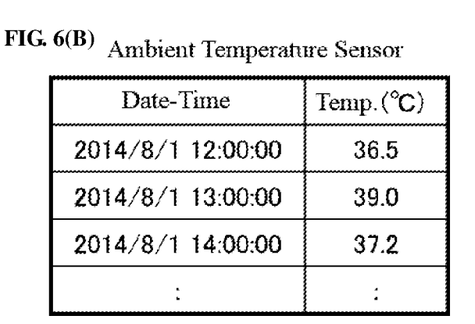
Figure 6C:
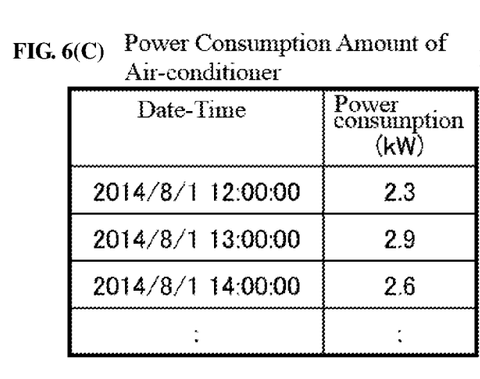
Figure 6D:
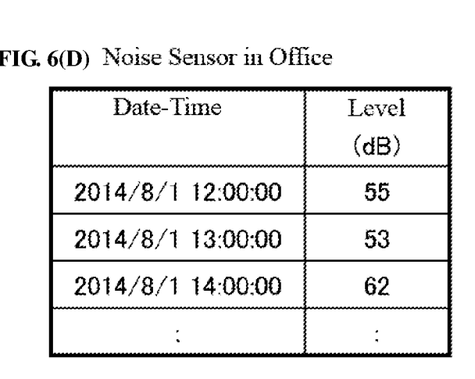
Figure 7:
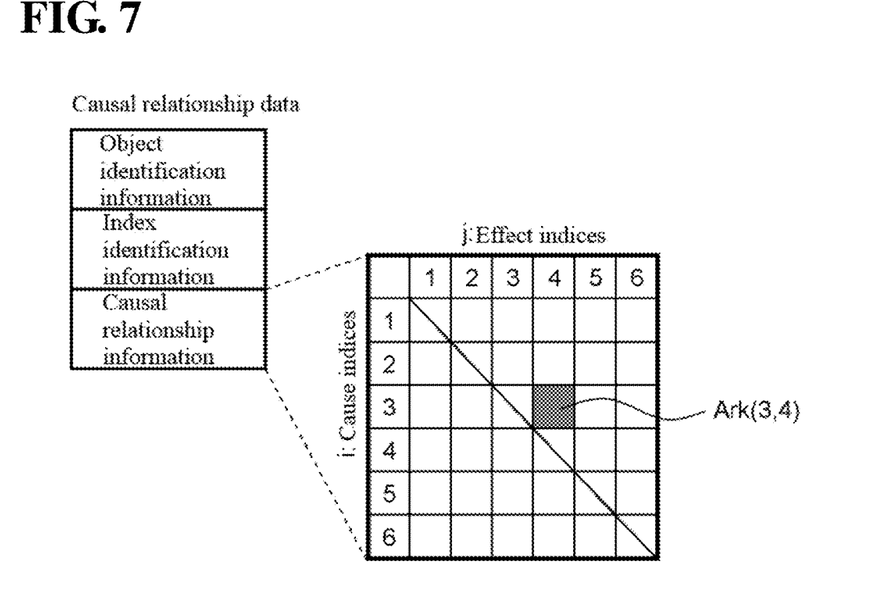
FIG. 7 shows an example of causal relationship data.
Figure 8:
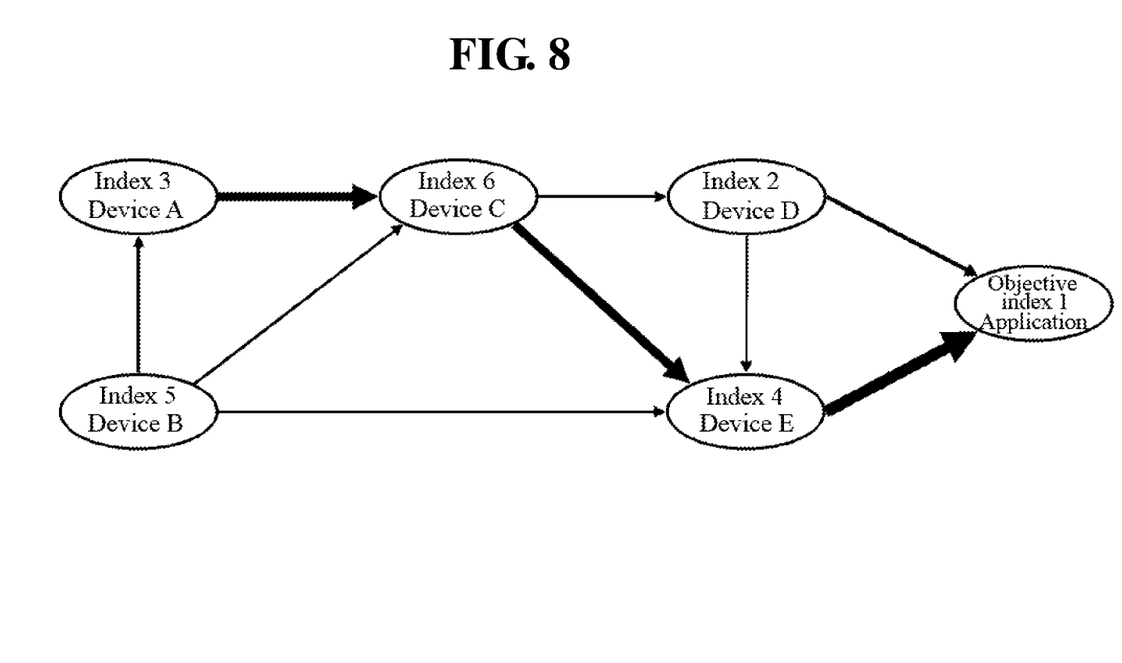
FIG. 8 shows an example of a causal network.

Generation of a causal network by the dataflow control apparatus 4 of one or more embodiments of the present invention will be described, with reference to FIG. 1 and FIGS. 3 to 8. FIGS. 3 and 4 are flowcharts of processing for generating a causal network, FIG. 5 is an example of time-series data of an objective index, and FIGS. 6A to 6D show examples of time-series data of device indices. FIG. 7 shows an example of causal relationship data, and FIG. 8 shows an example of a causal network.

In one or more embodiments of the present invention, an application 3 that improves office productivity is given as a specific example. As shown in FIGS. 1 and 3, a causal network generation unit 40 of the dataflow control apparatus 4 acquires time-series data of the objective index from the application 3 (step S30). An example of time-series data of the objective index is shown in FIG. 5. Here, index values (no unit) indicating the hourly productivity of the office are provided. This time-series data is data that the application 3 measures and records over a predetermined time period, and, for example, the number of transactions per unit time, sales or the like can be used as the objective index. The time period of the time-series data is arbitrary, although when the reliability of causal relationship inference is taken into consideration, it is favorable for time-series data for at least several days and desirably from several weeks to several months to be obtained.

Next, the causal network generation unit 40 acquires time-series data of the device index of each device 10 from the device data DB 20 of the M2M cloud server 2 (step S31). It is favorable to acquire various device indices such as, for example, time-series data of the room temperature measured with a temperature sensor installed in the office (FIG. 6A), time-series data of the outside temperature measured with a temperature sensor installed outside the office (FIG. 6B), time-series data of the power consumption amount of an air-conditioner in the office (FIG. 6C), and time-series data of the noise level measured by a noise sensor installed in the office (FIG. 6D). Additionally, it is favorable to acquire various types of sensing data or control data such as, for example, the control value (temperature setting value) of the air-conditioner in the office, the control value of ceiling lighting in the office (brightness setting), the measurement value of an illumination sensor installed in the office, the power consumption amount for the entire office, the network load of the office LAN, and the number of prints of the office printer or photocopier. Note that in the case where the number of devices 10 constituting the device network 1 is huge, and it is not realistic to acquire the time-series data of the device indices of all the devices 10 in terms of data volume and calculation cost, only the time-series data of the device index of some of the devices 10 may be acquired in step S31. For example, a configuration may be adopted in which, for example, the devices are roughly narrowed down to devices that appear to be relevant, based on the control target or prediction range of the application 3, the positional range or the like, and only the time-series data of the narrowed down devices is acquired from the M2M cloud server 2 (narrowing down of the devices may be performed by one of the M2M cloud server 2 and the dataflow control apparatus 4). The calculation cost incurred in generation of a causal network can thereby be reduced.

Next, the causal network generation unit 40 calculates the causal strength, correlation coefficient and delay time for all combinations of the two indices (cause and effect), based on the time-series data of the objective index and the device indices (step S32). The processing of step S32 is shown in detail in the flowchart of FIG. 4. Here, it is assumed that m indices E1 to Em are obtained in accordance with the objective index and the device indices.

The causal network generation unit 40 selects a group (Ei,Ej) of two indices from the m indices E1 to Em (step S41), and performs processing which will be discussed below. Here, Ei represents the cause index, Ej represents the effect index, and the subscripts i and j representing the index numbers satisfy i=1 to m, j=1 to m, i≠j.

First, the causal network generation unit 40 sets a delay time s to a minimum value smin (step S42). The causal network generation unit 40 then derives the causal strength between the cause index Ei and the effect index Ej obtained after the time s (step S43). In one or more embodiments of the present invention, transfer entropy TEij is used as the causal strength.

The transfer entropy is a measure or a technique for evaluating a causal relationship that takes into consideration the propagation time (delay time) between the two indices X and Y, and is a way of thinking that regards the average information amount (entropy) transferred from the index X to the index Y obtained after the time s as the strength of the influence that the cause index X exerts on the effect index Y obtained after the time s (i.e., causal strength). Note that although the correlation coefficient is based on a similar concept, the correlation coefficient differs from transfer entropy in that it only evaluates the degree of the linear relationship between the two indices X and the sign of the linear relationship, and does not take into consideration the direction of cause and effect (which index is cause and which is effect?) or the time delay.

When the respective time-series data of the indices X and Y are given as x(t) and y(t) and the respective probability density functions are given as P(x(t)) and P(y(t)), transfer entropy $TE_{XY}(s)$ relating to the delay time s in which the index X is the cause and the index Y is the effect can be calculated with the following equation.

$$TE_{XY}(s) = \left[\log_2 \frac{P(y(t+s), y(t), x(t)) \cdot P(y(t))}{P(y(t), x(t)) \cdot P(y(t+s), y(t))}\right] \quad \text{Equation 1}$$

Here, P(a,b) represents the joint probability density variables of P(a) and P(b), and [*] represents the time average of *.

As evident from the above equation, the transfer entropy can be calculated by supplying the time-series data and the delay time s of the two indices X and Y. Here, $TE_{XY}(s) > TE_{XY}(s)$ holds true between the value of $TE_{XY}(s)$ and the value of $TE_{XY}(s)$ calculated by interchanging cause and effect, in the case where a causal relationship in which X is the cause and Y is the effect exists between the indices X and Y. Therefore, the existence of a causal relationship and the direction of cause and effect can be judged, by evaluating the size relationship of the values of $TE_{XY}(s)$ and $TE_{XY}(s)$. Also, the maximum value of the causal strength between the cause index X and the effect index Y and the delay time s at which the causal strength is at the maximum can be derived, by calculating the transfer entropy $TE_{XY}(s)$ for different values of s.

In the processing of step S41, the transfer entropy in the opposite direction, that is, transfer entropy TEji from the index Ej obtained after the time s to the index Ei is calculated, and if the transfer entropy in the opposite direction is larger (TEji>TEij), it is judged that a causal relationship in which the index Ei is the cause and the index Ej is the effect does not exist between two indices (Ei,Ej), and it is favorable to set the causal strength to zero.

If a causal relationship is confirmed between the cause index Ei and the effect index Ej (if the causal strength is not zero) (step S44: YES), the causal network generation unit 40 calculates the correlation coefficient of the cause index Ei and the effect index Ej obtained after the time s (step S45). Since the calculation method of the correlation coefficient is well-known, description thereof is omitted.

The processing of the above steps S43 to S45 is executed repeatedly while increasing the value of s by a time step width Δs with each iteration (step S46), and when the processing is ended at a maximum value smax of the delay time (step S47), the causal network generation unit 40 shifts to processing of the next group of indices (step S48: NO). When evaluation of the causal relationship is ended for all groups of two indices (step S48: YES), the causal network generation unit 40 advances the processing to step S33 of FIG. 3.

The causal network generation unit 40 generates causal relationship data, and stores the generated data in a causal network storage unit 41 (step S33).

FIG. 7 schematically shows an example of the data structure of the causal relationship data. The causal relationship data includes "object identification information" which is information for specifying the application 3 or the objective index, "index identification information" which is information for specifying what device each of the m indices was acquired from, and causal relationship information for every group of two indices. The ID of the application 3, the ID of the objective index and the like, for example, are described in the object identification information. The ID of the device corresponding to each index and the like, for example, is described in the index identification information. Note that an index 1 is given as the objective index, and the ID of the application 3 is described in the index identification information of the index 1.

The causal relationship information is constituted by a two-dimensional array m×m (FIG. 7 shows an example in which m=6), and the causal relationship information of the causal relationship between the cause index i and the effect index j is stored in a cell of an element number (i,j). An exemplary data description of a causal relationship information Ark(3,4) of an element number (3,4) is shown below.

```
Ark(3,4) = {
    Causality = 0.58;
    Delay = 3;
    Co_CoEf = −0.7
}
```

Causality is strength information representing the maximum causal strength (transfer entropy) between the cause index i and the effect index j, and Delay is time information representing the delay time at which the causal strength is at the maximum. Co_CoEf is correlation information representing the direction of change in the effect index j (is the correlation positive or negative?) relative to an increase or decrease in the cause index i. In this example, "time" is used as the unit of Delay, and the correlation coefficient between the cause index i and the effect index j obtained after Delay is used as the correlation information. That is, based on the causal relationship information Ark(3,4) of the above example, it is known that a causal relationship exists between the cause index 3 and the effect index 4 and the direction of cause and effect thereof is from the cause index 3 to the effect index 4, that the causal strength is 0.58, that the influence of the cause index 3 takes (is delayed by) 3 hours to propagate to the effect index 4, and that the cause index 3 and the effect index 4 are negatively correlated and the strength of the correlation is 0.7.

Note that in the aforementioned step S44, Ark(i,j) is set to NULL, in the case where it is judged there is not a causal relationship between the indices i and j. Ark(i,j) of cells in which i=j is also set to NULL.

FIG. 8 is an example of a causal network in which the causal relationship between the indices is shown with a directed graph, on the basis of the causal relationship data of FIG. 7. In this directed graph, each node corresponds to an index, and the ID of the index and the ID of the corresponding device are associated with the node. The arc linking two nodes indicates the causal relationship between the two nodes and the direction of cause and effect (base end side of the arc is the cause node and arrow side of the arc is the effect node). Also, the thickness of the arc shows the causal strength. In the example in FIG. 8, it is evident that there is propagation having strong cause and effect in the following order: index 3 obtained with device A→index 6 obtained with device C→index 4 obtained with device E→objective index 1 of application 3. In other words, it is evident that the device index 4, the device index 6 and the device index 3 are useful in inferring the value or state of the objective index 1 of the application 3.

Control of Dataflow

Figure 9:
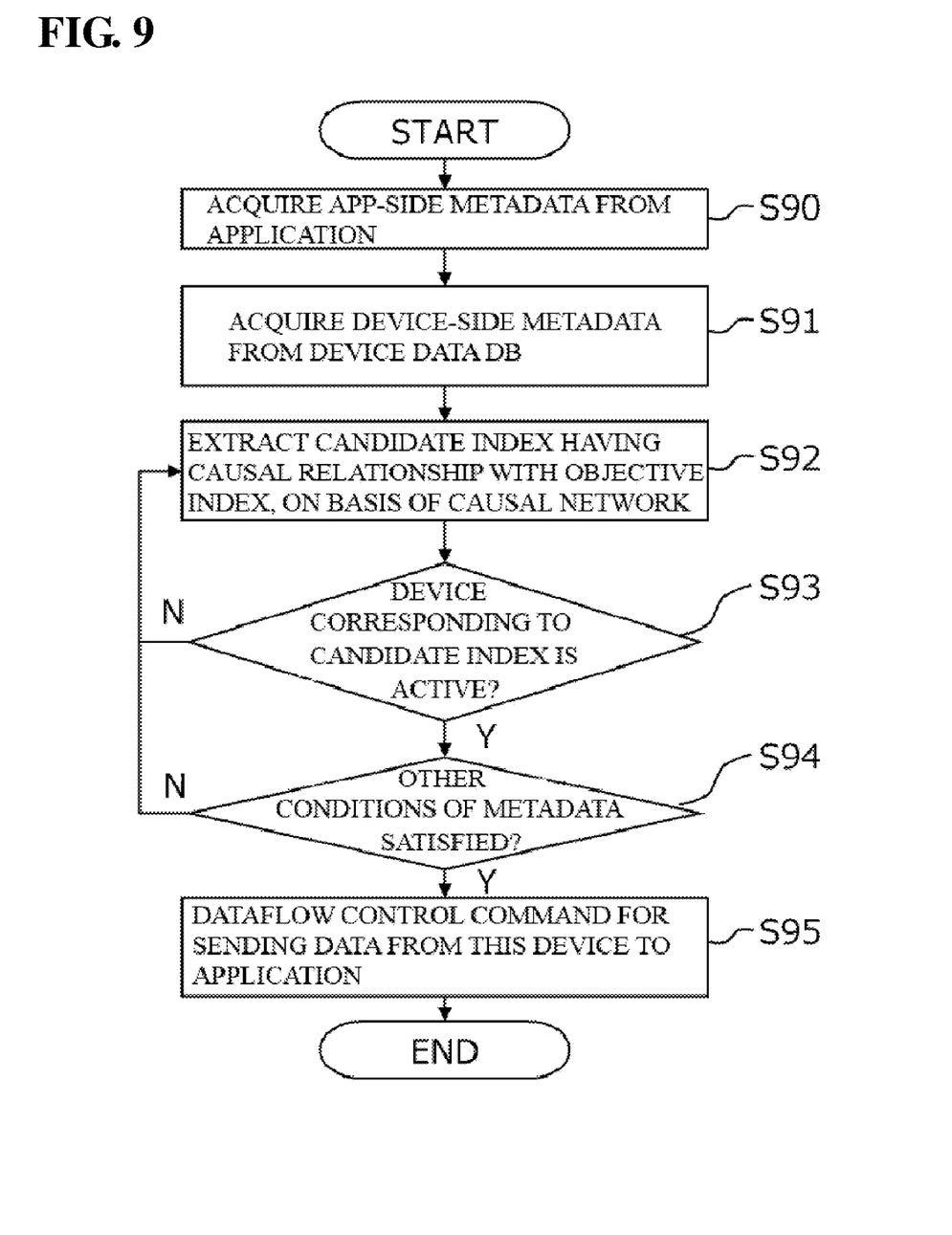
FIG. 9 is a flowchart of processing for selecting device indices and processing for controlling dataflow.
Figure 10:
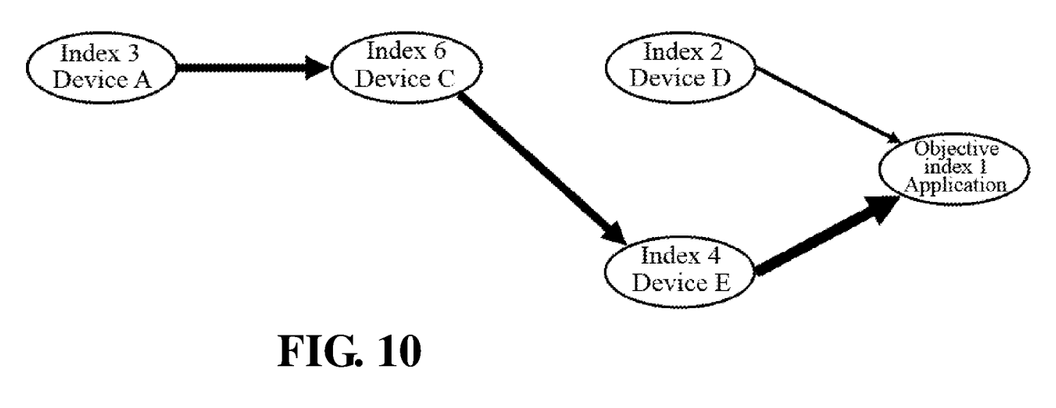
FIG. 10 is a diagram schematically showing selection of device indices that is based on a causal network.

Dataflow control by the dataflow control apparatus 4 of one or more embodiments of the present invention will be described, with reference to FIGS. 2, 9 and 10. FIG. 9 is a flowchart of processing for selecting device indices and processing for controlling dataflow, and FIG. 10 is a diagram schematically showing selection of a device index based on a causal network.

As shown in FIG. 2, the dataflow control apparatus 4 has a device index selection unit 42 and a dataflow control unit 43 as functions related to dataflow control. Causal relationship data already generated for the objective index of the application 3 is assumed to be stored in the causal network storage unit 41.

First, the device index selection unit 42 acquires app-side metadata that serves as a data request from the application 3 (step S90). The ID of the objective index and the desired utilization time and fee, for example, are included in the app-side metadata. Also, the device index selection unit 42 acquires device-side metadata of each device 10 from the device data DB 20 of the M2M cloud server 2 (step S91). The aforementioned information relating to the device is described in the device-side metadata. Note that in the case where the number of devices 10 constituting the device network 1 is huge, and it is not realistic to acquire the metadata of all the devices 10 in terms of data volume and calculation cost, only the metadata of some of the devices 10 may be acquired in step S91. In this case, a configuration may similarly be adopted in which, for example, the devices are roughly narrowed down to devices that appear to be relevant, based on the control target or prediction range of the application 3, the positional range or the like, and only the metadata of the narrowed down devices is acquired from the M2M cloud server 2 (narrowing down of the devices may be performed by one of the M2M cloud server 2 and the dataflow control apparatus 4).

Next, the device index selection unit 42 selects a device index having a causal relationship with the target index, based on the causal network (causal relationship data) stored in the causal network storage unit 41 (step S92). In one or more embodiments of the present invention, candidate device indices are selected in accordance with the following rules.

(1) In a causal network, the device index whose distance to the objective index is closest is given priority. Note that "distance" is defined as the number of arcs between two indices (nodes).

(2) In the case where the distances are the same, the index whose causal strength is stronger is given priority (indices whose causal strength is less than a predetermined threshold value will, however, not be selected).

(3) In the case where the distances and the causal strengths are the same, the index whose delay time is shortest is given priority.

FIG. 10 is a partial network, showing only the causal relationship that satisfies the condition that the causal strength is larger than a threshold value, in the causal network of FIG. 8. When the above rules (1) to (3) are applied to FIG. 10, candidates will be selected in the following order: index 4→index 2→index 6→index 3. Device indices whose relationship with the objective index is strong can thereby be preferentially selected.

The device index selection unit 42 checks whether the devices corresponding to the candidate indices selected at step S92 are active (step S93). Information indicating whether a device is active or inactive may be obtained directly from the device or may be obtained from the M2M cloud server 2 (e.g., the status of the device is checked using a ping command, etc.). If a device is inactive, that is, if in a state where current data (latest data) cannot be acquired from the device due to stoppage, malfunction, movement or the like of the device (step S93: NO), the device index selection unit 42 returns the processing to step S92 and selects the next candidate index. If a device is active, that is, if in a state where current data can be acquired from the device (step S93: YES), the device index selection unit 42 checks whether other conditions (e.g., price, utilization range, utilization time, etc.) described in the metadata match the request of the application 3 (step S94). If there are conditions that do not match (step S94: NO), the device index selection unit 42 returns the processing to step S92 and selects the next candidate index. As a result of the above processing, a device index having a causal relationship with the objective index, whose device is active and that also satisfies the other conditions is selected.

The dataflow control unit 43 then generates a dataflow control command that sets the transmission source to the device 10 corresponding to the selected device index and sets the transmission destination to the application 3, and transmits the dataflow control command to the M2M cloud server 2 (step S95).

An example of dataflow control in the case where "Index 6: Device C" is selected in FIG. 10 will be described. At this time, the dataflow control unit 43 transmits a dataflow control command that defines the dataflow from "the device C" to "the application 3" to the M2M cloud server 2. The following information, for example, is included in the dataflow control command.

ID of device C
ID of application 3
Index 6 (cause) acquired with device C→Causal relationship information Ark(6,4) of index 4 (effect)
Index 4 (cause)→Causal relationship information Ark(4, 1) of objective index 1 (effect)

The M2M cloud server 2 serving as an information processing apparatus that manages devices such as sensors executes the next dataflow control, upon reading the dataflow control command (also called a control command data stream) that is issued (transmitted) from the dataflow control unit 43. The M2M cloud server 2 generates a prediction function $f_{6 \to 4}$ that predicts (infers) the data of the index 4 from the data of the index 6, based on parameters such as the causal strength, the delay time and the correlation coefficient in the causal relationship information Ark(6,4). Also, the M2M cloud server 2 generates a prediction function $f_{4 \to 1}$ that predicts (infers) the data of the objective index 1 from the data of the index 4 in a similar manner.

The M2M cloud server 2 then calculates prediction data dp of the objective index 1 from the latest data dc acquired by the device C such that $$dp = f_{4 \to 1}(f_{6 \to 4}(dc))$$

and transmits the data dp to the application 3. Since the data dp of the objective index 1 is thus derived from the data dc of the device index 6 which has a strong causal relationship with the objective index 1, the value of the objective index 1 can be inferred with high validity.

Note that instead of calculating the prediction data dp with the M2M cloud server 2, the data dc and causal relationship information Ark(6,4) and Ark(4,1) or the data dc and prediction functions $f_{6 \to 4}$, and $f_{4 \to 1}$ may be transmitted to the application 3, and calculation of the value dp of the objective index 1 may be executed from the data dc on the application 3 side.

According to the above configuration, when the objective of the application (index that the application controls or predicts) is supplied, data having a causal relationship with the objective thereof is automatically provided to the application 3 from a corresponding device 10. Accordingly, design and development of the application 3 become possible, even without knowing what kind of devices exist in the device network 1, what kind of data can be acquired, or what kind of data to refer to in order to perform the control or prediction serving as the objective. Therefore, compared with former technologies, design and development of the application 3 utilizing data in the device network 1 is facilitated, and utilization and distribution of data in the device network 1 are promoted.

Also, devices that are in an inactive state (state where data cannot be acquired) due to a cause of some sort, such as malfunction, stoppage, movement or the like, are excluded from selection. According, an appropriate device (device capable of acquiring data having a causal relationship with the objective index of the application 3) can be automatically selected, from among the devices that are currently active, and the robustness of the system can be enhanced.

Control of Device by Application

In one or more embodiments of the present invention, a causal network was utilized in order to select a device index to be provided to the application 3, but, pursuing this further, it is also possible to utilize a causal network in order for the application 3 to actively adjust the value of the objective index.

Figure 11:
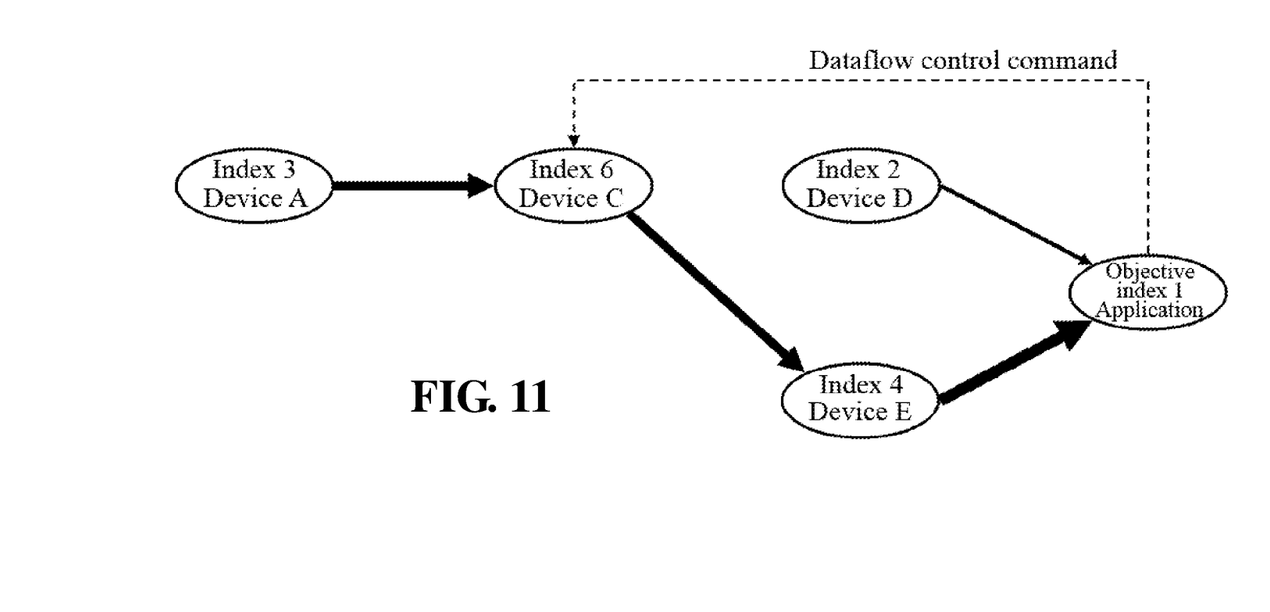
FIG. 11 is a diagram schematically showing device control that is based on a causal network.

Assume that, as shown in the example in FIG. 11, the device indices 2, 4, 6 and 3 have been selected as indices that can affect the objective index 1. In the case where an actuator exists in the devices D, E, C and A corresponding to these device indices, it is possible to cause the value of the objective index 1 to be adjusted (increased or decreased), by sending a device control command to the actuators from the application 3.

For example, in FIG. 11, in the case where it is assumed that the device C is an air-conditioner, and the index 6 is a temperature setting value of the air-conditioner the device E is a room temperature sensor, and the index 4 is the temperature in an office, and the objective index 1 is office productivity, a system can be built in which the application 3 changes the temperature in the office by transmitting a device control command for changing the index 6 (temperature setting value) of the device C (air-conditioner), in order to approximate the value of the objective index 1 (office productivity) to an objective value. Note that the device control command may be transmitted directly to the device C from the application 3, or via the M2M cloud server 2.

In this way, by using a causal network, an actuator that can exert an influence on the value of the objective index can be easily specified. Also, by enabling device control by the application 3, it becomes possible for the objective index to be actively adjusted by the application 3, enhancing the flexibility of application development.

Other Embodiments

The configurations above are only specific examples according to one or more embodiments of the present invention, and are not intended to limit the scope of the present invention. The present invention can take various specific configurations, without departing from the technical concept of the invention.

For example, although, in one or more of the above embodiments, only a few indices (devices) were illustrated as an example of a causal network, it is in fact also possible to form a causal network of indices (devices) numbering in the tens to the hundreds or more. Although, in one or more of the above embodiments, sensors and actuators were shown as an example of devices, it is possible to use not only real devices but also virtual devices (e.g., modules configured to output one piece of sensing data generated by combining sensing data obtained with a plurality of sensors, etc.). Although, in one or more of the above embodiments, an example in which actuators are controlled was shown as an example of device control, it is also possible to control sensors (e.g., adjusting pan, tilt and zoom of a camera, changing the sampling period of measurement, etc.).

INDEX TO THE REFERENCE NUMERALS

1: Device network
10: Device
2: M2M cloud server
20: Device data DB
3: Application
4: Dataflow control apparatus
40: Causal network generation unit
41: Causal network storage unit
42: Device index selection unit
43: Dataflow control unit

The invention claimed is:

1. A dataflow control apparatus for controlling a dataflow and that provides data obtained in at least one device among a plurality of devices to an application that utilizes the data, comprising: a causal network storage that stores a causal network representing a causal relationship between a plurality of indices that include at least a plurality of device indices which are respectively data obtained in the plurality of devices and an objective index which is an index that the application controls or predicts; a device index selector that selects, based on the causal network, at least one device index having a causal relationship with the objective index of the application, from among the plurality of device indices, in a case where a data request is received from the application; and a dataflow controller that controls the dataflow, such that data obtained in the device corresponding to the selected device index is provided to the application, wherein the causal relationship includes information on a causal strength between two indices comprising the device indices and the objective index and information on a delay time taken for an influence of one of the two indices to propagate to the other index.

2. The dataflow control apparatus according to claim 1, wherein the causal relationship is defined using transfer entropy.

3. The dataflow control apparatus according to claim 1, wherein the device index selector preferentially selects, in the causal network, the device index whose distance to the objective index is closest, preferentially selects the device index whose causal strength is strongest in a case where distances are the same, and preferentially selects the device index whose delay time is shortest in a case where distances and causal strengths are the same.

4. The dataflow control apparatus according to claim 1, wherein the device index selector checks whether the devices are active or inactive, and excludes the device indices corresponding to inactive devices from selection.

5. A dataflow control method for controlling a dataflow and that provides data obtained in at least one device among of a plurality of devices to an application that utilizes the data, comprising: selecting, based on a causal network representing a causal relationship between a plurality of indices that include at least a plurality of device indices which are respectively data obtained in the plurality of devices and an objective index which is an index that the application controls or predicts, at least one device index having a causal relationship with the objective index of the application, from among the plurality of device indices, in a case where a data request is received from the application; and controlling the dataflow, such that data obtained in the device corresponding to the selected device index is provided to the application, wherein the causal relationship includes information on a causal strength between two indices comprising the device indices and the objective index and information on a delay time taken for an influence of one of the two indices to propagate to the other index.

6. A program stored on a non-transitory computer-readable medium for causing a computer to execute the steps of the dataflow control method according to claim 5.

7. A control command data stream readable by an information processing apparatus for managing sensors that output sensing data, the data stream including:
information specifying an application that utilizes the sensing data;
information specifying a sensor selected to output sensing data having a causal relationship with an objective index which is an index that the application controls or predicts; and
information on the causal relationship between the sensing data obtained by the selected sensor and the objective index,
wherein the causal relationship information includes information on a causal strength between the sensing data and the objective index and information on a delay time taken for an influence of the sensing data to propagate to the objective index.

8. The dataflow control apparatus according to claim 1, wherein the device index selector checks whether the devices are active or inactive, and excludes the device indices corresponding to inactive devices from selection.

9. The dataflow control apparatus according to claim 2, wherein the device index selector checks whether the devices are active or inactive, and excludes the device indices corresponding to inactive devices from selection.

10. The dataflow control apparatus according to claim 3, wherein the device index selector checks whether the devices are active or inactive, and excludes the device indices corresponding to inactive devices from selection.

* * * * *